(12) United States Patent
Jeong

(10) Patent No.: US 9,381,853 B2
(45) Date of Patent: Jul. 5, 2016

(54) CONTROL SYSTEM AND METHOD FOR AUTO-LIGHT

(71) Applicant: Hyundai Motor Company, Seoul (KR)

(72) Inventor: Yongseok Jeong, Seoul (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 14/138,930

(22) Filed: Dec. 23, 2013

(65) Prior Publication Data
US 2015/0084505 A1 Mar. 26, 2015

(30) Foreign Application Priority Data
Sep. 25, 2013 (KR) .................. 10-2013-0114066

(51) Int. Cl.
*B60Q 1/14* (2006.01)

(52) U.S. Cl.
CPC ..................... *B60Q 1/143* (2013.01)

(58) Field of Classification Search
CPC .. B60Q 1/0023; B60Q 1/1423; B60Q 1/1438; B60Q 1/085; B60Q 1/1446; B60Q 1/22
USPC .......................... 315/77, 80, 82, 83
See application file for complete search history.

(56) References Cited

U.S. PATENT DOCUMENTS

| | | | | |
|---|---|---|---|---|
| 6,465,963 B1* | 10/2002 | Turnbull | ............... | B60C 23/061 307/10.8 |
| 2005/0157509 A1* | 7/2005 | Tsukamoto | .......... | B60Q 1/1423 362/465 |
| 2012/0212132 A1* | 8/2012 | Sakaguchi | ........... | B60Q 1/1423 315/77 |

FOREIGN PATENT DOCUMENTS

| | | |
|---|---|---|
| JP | 2004-179168 A | 6/2004 |
| JP | 2005-199974 A | 7/2005 |
| KR | 10-2005-0003651 A | 1/2005 |

\* cited by examiner

*Primary Examiner* — Lincoln Donovan
*Assistant Examiner* — Thomas Skibinski
(74) *Attorney, Agent, or Firm* — Mintz Levin Cohn Ferris Glovsky and Popeo, P.C.; Peter F. Corless

(57) ABSTRACT

A control system and method for an automated lighting feature of a vehicle is provided. In particular, a controller receives position data; determines whether the vehicle is within or is entering a particular tunnel from the position data; senses by a sensor, a sensed illumination level of a particular section in the tunnel; receives data related to a reference tunnel illumination level of the particular section in the tunnel; compares the sensed illumination level with the reference tunnel illumination level; and changes a reference light illumination level for turning on/off a light when the difference between the sensed illumination level and the reference tunnel illumination level is a particular value or more.

16 Claims, 2 Drawing Sheets

CONTROL SYSTEM AND METHOD FOR AUTO-LIGHT

CROSS-REFERENCE TO RELATED APPLICATION

This application claims priority to and the benefit of Korean Patent Application No. 10-2013-0114066 filed in the Korean Intellectual Property Office on Sep. 25, 2013, the entire contents of which are incorporated herein by reference.

BACKGROUND OF THE INVENTION (a) Field of the Invention

The present invention relates to a control system and method for an auto-light, and more particularly, to a control system and method for an auto-light which is more safe and convenient by actively changing reference illumination for automatically turning on/off the lights of a vehicle.

(b) Description of the Related Art

In general, control of vehicles has been increasingly electronically implemented with the development of electronic communication technology and a GPS (Global Positioning System) which is used previously in airplanes and ships. As drivers are now more aware of traffic and geography surrounding them.

Further, for vehicles, stability in driving is improved and convenience for drivers is increased by sensing the amount of external light and automatically turning on the lights of the vehicles. Typically, the lights are turned on when the sensed external light decreases to a particular level or less.

The illumination sensors that are mounted on vehicles are typically disposed in front of the driver's seat in the vehicles in or around the windshield of the vehicles. Some vehicles, however, have utilized a tinting feature at the top portion of the windshield to reduce the amount of glare from the sun. However, when this tinting is used, the accuracy of the sensors decreases due to the darkened glass and thus the lights may be turned on, even it is still bright outside.

That is, when a customer receives a vehicle and then covers the windshield of the vehicle with film for tinting, this can cause the automatic lights turned on to be turned on prematurely. Therefore, there is a need of technology of turning on/off lights at particular illumination, even if a driver modifies a tint level of windshields in a vehicle.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a control system and method for an auto-light having advantages of improving effectiveness of a vehicle's vehicle automatic light feature and convenience for a driver by adjusting on-off light reference illumination levels accordingly. In particular, lights are turned on/off in accordance with the driving conditions of the vehicle, on the basis of illumination levels sensed by an illumination sensor.

An exemplary embodiment of the present invention provides a control method of an auto-light, which may include: receiving position data at a controller; determining, by the controller, whether the vehicle is passing a particular tunnel from the position data; sensing a sensed illumination level of a particular section in the tunnel; receiving, at the controller, data related to a reference tunnel illumination level of the particular section in the tunnel; comparing, by the controller, the sensed illumination level with the reference tunnel illumination level; and changing, by the controller, a reference light illumination level for turning on/off a light, when the difference between the sensed illumination level and the reference tunnel illumination level is a particular value or more.

In some exemplary embodiments, the position data may be received from an external GPS. The sensed illumination level may be sensed by an illumination sensor (e.g., a photo detector). The reference light illumination level and reference tunnel illumination level may be stored on a memory within the controller. The reference tunnel illumination level may be an illumination level corresponding to a particular section of the tunnel. This particular section is not an inlet or an outlet of the tunnel and thus is not effected by ambient light and therefore should be a constant value which can be used for comparision purposes. The method may include changing, by the controller, the reference light illumination level and turning on/off lights, using the changed reference light illumination level.

The illumination sensor may be disposed in front of the driver's seat in a vehicle within the windshield.

In the control system and method of an auto-light according to the present invention for achieving the object of the present invention, it is possible to improve the accuracy of the automatic lighting feature and convenience for a driver by changing on-off reference illumination levels triggering a light to be turned on/off, by comparing the reference illumination level of a tunnel with the illumination level sensed by the illumination sensor.

Further, even if the windshield of a vehicle is tinted by the driver, it is possible to improve the automated feature and convenience of the driver by maintaining a proper brightness level at which a light is turned on/off, by changing the on-off reference illumination levels of the light.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
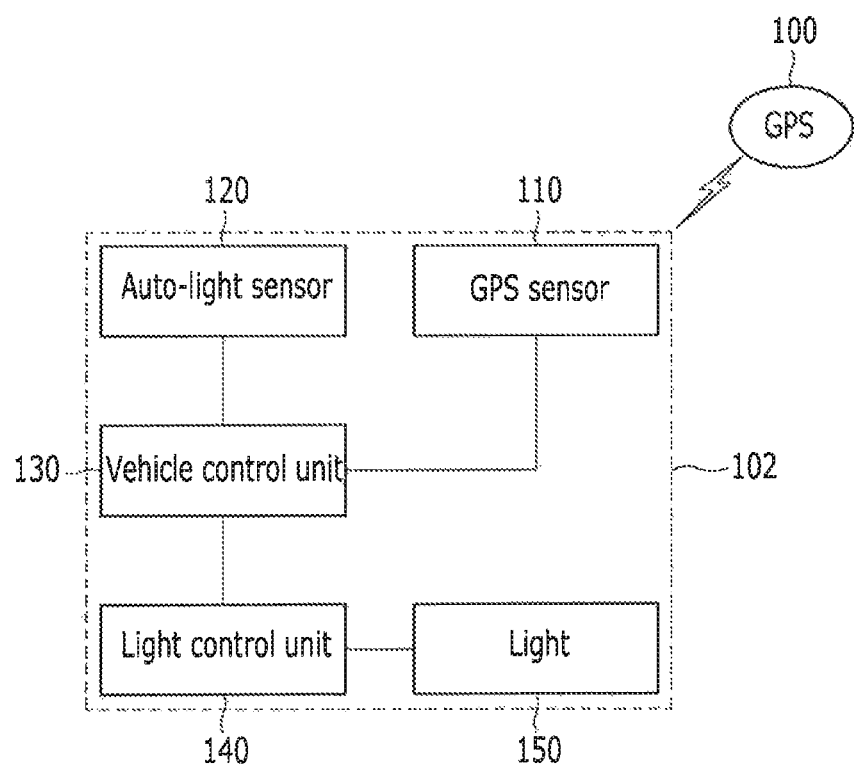
FIG. 1 is a schematic diagram of a control system for an auto-light according to an exemplary embodiment of the present invention.

FIG. 1 is a schematic diagram of a control system for an auto-light according to an exemplary embodiment of the present invention. Referring to FIG. 1, an auto-light control system includes a vehicle controller 130, a light controller 140, a light 150, a GPS sensor 110, an auto-light sensor 120, and a GPS 100.

The auto-fight sensor 120 may be an illumination sensor that senses an amount of external light surrounding the vehicle and may be disposed in front of the driver's seat in a vehicle 102 within the windshield of the vehicle. The installation structure of the auto-light sensor 120 is known in the art and thus the detailed description is not provided.

The GPS sensor 110 receives the current position information of the vehicle from the GPS 100 and the vehicle controller 130 automatically turns on/off the light 150 by controlling the light controller 130 on the basis of data from the auto-light sensor 120 and the GPS sensor 110.

The vehicle controller 130 may turn on the light 150 by controlling the light controller 140, when determining that the sensed illumination level from the auto-light sensor 120 is a reference light illumination level or less, and it may turn off the light by controlling the light controller 140, when determining that the sensed illumination level from the auto-light sensor 120 is larger than the reference light illumination level.

In an exemplary embodiment of the present invention, the vehicle controller 130 improves the accuracy of the automatic light feature while driving the vehicle 102 and convenience for the driver by changing the reference illumination level.

To this end, the vehicle controller 130 senses the position data of the vehicle 102 through the GPS sensor 110 and determines whether the vehicle passes (or is within) a tunnel (not shown). Further, controller 130 selects a reference tunnel illumination level associated with the tunnel and senses the illumination level of the tunnel from the auto-light sensor 120.

Further, the controller 130 then compares the illumination level of the tunnel with the reference tunnel illumination level, and when the difference is a particular value or more (depending on the situation), the controller 130 changes the reference light illumination level and stores the changed level.

The position data may be received from an external GPS. The sensed illumination level may be sensed by an illumination sensor (e,g., a photo detector). The reference light illumination level and reference tunnel illumination level may be stored on a memory within the controller. The reference tunnel illumination level may be an illumination level corresponding to a particular section of the tunnel. This particular section is not an inlet or an outlet of the tunnel and thus is not effected by ambient light and therefore should be a constant value which can be used for comparision purposes.

In an exemplary embodiment of the present invention, the reference tunnel illumination level, which is predetermined data, may be received from a specific server or may be stored on a specific memory in the vehicle. Accordingly, the particular value can be set to be any brightness level selected by a manufacture.

Figure 2:
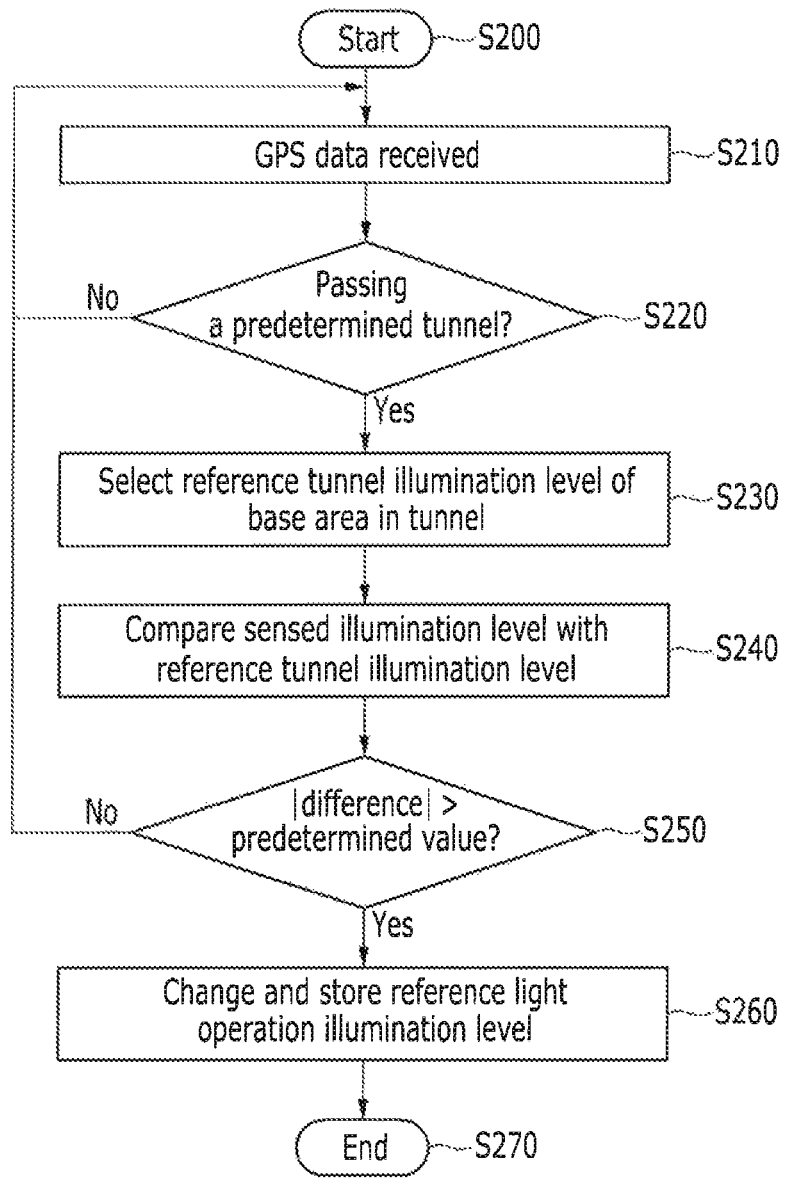
FIG. 2 is a flowchart illustrating a control method of an auto-light according to an exemplary embodiment of the present invention.

FIG. 2 is a flowchart illustrating a control method of an auto-light according to an exemplary embodiment of the present invention. Referring to FIG. 2, control starts in S200 and position data is received from the GPS 100 in S210. Further, whether the vehicle 102 is within or has passed a tunnel is determined in S220.

A reference tunnel illumination level at a particular base area in the tunnel is selected in S230, and in S240, an illumination level is sensed by the auto-light sensor 120, when the vehicle passes a base area in the tunnel, and the illumination level and the reference tunnel illumination level are compared.

When the difference between the illumination level and the reference tunnel illumination level is a particular value or more in S250, the reference light illumination level for automatically turning on/off the lights 150 is changed, corresponding to the difference between the two values, and then stored on the memory. Then, the control is ended in S270.

Accordingly, in an exemplary embodiment of the present invention, it is possible to maintain a constant illumination level at which the lights on the vehicle are turned on, even if the sensed illumination level is lower than the actual illumination level due to tinting of the windshield of a vehicle, by changing the reference light illumination level in accordance with conditions by the user.

Further, the particular tunnel in an exemplary embodiment of the present invention includes an inlet connection area, an interference area, a performing area, a base area, and an outlet from a reference point at the inlet of the tunnel, and the base area is ruled to have particular illumination (60 lux or more, reference tunnel illumination level), under KSC3703. When the vehicle passes the base area, the auto-light sensor senses an illumination level.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims,

DESCRIPTION OF SYMBOLS

| 100: GPS | 102: vehicle |
|---|---|
| 110: GPS sensor | 120: auto-light sensor |
| 130: vehicle controller | 140: light controller |
| 150: light | |

What is claimed is:

1. A control method for an automatic lighting system in a vehicle, the method comprising:
   receiving, by a controller, position data;
   determining, by the controller, whether the vehicle has entered a tunnel based on the position data;
   sensing, by a sensor, a sensed illumination level of a particular section in the tunnel;
   receiving, by the controller, data related to a reference tunnel illumination level of the particular section in the tunnel;
   comparing, by the controller, the sensed illumination level with the reference tunnel illumination level; and changing, by the controller, a reference light illumination level for turning on/off lights of the vehicle when the difference between the sensed illumination level and the reference tunnel illumination level is a particular value or more, wherein the reference tunnel illumination level is an illumination level corresponding to a particular section of the tunnel, wherein the particular section is not an inlet or an outlet of the tunnel.

2. The method of claim 1, wherein the position data is received from an external GPS.

3. The method of claim 1, wherein the sensed illumination level is sensed through a photo-detector.

4. The method of claim 3, wherein the illumination sensor is disposed in front of the driver's seat in a vehicle within the windsheild.

5. The method of claim 1, wherein the reference light illumination level is stored on a memory.

6. The method of claim 1, further comprising turning on/off a light based on the changed reference light illumination level.

7. The method of claim 1, wherein the reference tunnel illumination level is stored in a memory.

8. A control system for an automatic lighting system in a vehicle, the system comprising:
   a sensor configured to detect an illumination level; and
   a controller configured to receive position data, determine whether the vehicle has entered a tunnel based on the position data, receive data related to a reference tunnel illumination level of the particular section in the tunnel, compare a sensed illumination level by the sensor with the reference tunnel illumination level, and change a reference light illumination level for turning on/off lights of the vehicle when the difference between the sensed illumination level and the reference tunnel illumination level is a particular value or more, wherein the reference tunnel illumination level is an illumination level corresponding to a specific section of the tunnel, wherein the particular section is not an inlet or an outlet of the tunnel.

9. The system of claim 8, wherein the position data is received from an external GPS.

10. The system of claim 8, wherein the sensor is a photo-detector.

11. The system of claim 10 wherein the illumination sensor is disposed in front of the driver's seat in a vehicle within the windsheild.

12. The system of claim 8, wherein the reference light illumination level is stored on a memory.

13. The system of claim 8, wherein the controller is further configured to turn on/off vehicle lights based on the changed reference light illumination level.

14. The system of claim 8, wherein the reference tunnel illumination level is stored in a memory.

15. A non-transitory computer readable medium containing program instructions executed by a processor or controller, the computer readable medium comprising:
   program instructions that determine whether a vehicle has entered a tunnel based on position data,
   program instructions that compare a sensed illumination level with a reference tunnel illumination level, and change a reference light illumination level for turning on/off lights of the vehicle when the difference between the sensed illumination level and the reference tunnel illumination level is a specific value or more,
   wherein the reference tunnel illumination level is an illumination level corresponding to a particular section of the tunnel, wherein the particular section is not an inlet or an outlet of the tunnel.

16. The non-transitory computer readable medium of claim 15, further comprising program instructions that turn on/off vehicle lights based on the changed reference light illumination level.

* * * * *